United States Patent [19]

Roux

[11] Patent Number: 4,674,726

[45] Date of Patent: Jun. 23, 1987

[54] SUPPORT TRUCK FOR VEHICLE OR EQUIPMENT

[76] Inventor: Pierre Roux, 34, rue Garibaldi, Lyon, France, F-69001

[21] Appl. No.: 817,835

[22] PCT Filed: Apr. 12, 1985

[86] PCT No.: PCT/FR85/00082

§ 371 Date: Dec. 13, 1985

§ 102(e) Date: Dec. 13, 1985

[87] PCT Pub. No.: WO85/04644

PCT Pub. Date: Oct. 24, 1985

[30] Foreign Application Priority Data

Apr. 13, 1984 [FR] France ............................ 84 06088

[51] Int. Cl.[4] ............................................ B60P 1/10

[52] U.S. Cl. .................................. 254/7 R; 248/352

[58] Field of Search ............... 254/2 R, 2 B, 6 R, 6 B, 254/7 R, 7 B, 84–85; 280/79.1 R; 248/352

[56] References Cited

U.S. PATENT DOCUMENTS

| | | | |
|---|---|---|---|
| 1,304,680 | 5/1919 | Hart | 254/7 B |
| 1,341,621 | 5/1920 | Seas . | |
| 1,478,307 | 12/1923 | Sykes et al. | 254/85 |
| 2,608,313 | 8/1952 | Wilson | 254/7 R X |
| 2,637,522 | 5/1953 | Wallace . | |
| 3,405,781 | 10/1968 | Brown . | |
| 3,433,447 | 3/1969 | Carroll | 248/352 |
| 3,504,889 | 4/1970 | Wyrough . | |
| 3,690,608 | 9/1972 | Poizner . | |
| 4,177,978 | 12/1979 | Warsaw | 254/2 R X |
| 4,383,681 | 5/1983 | Walters . | |
| 4,491,305 | 1/1985 | Walters . | |

FOREIGN PATENT DOCUMENTS

| | | |
|---|---|---|
| 0861459 | 7/1949 | Fed. Rep. of Germany . |
| 2250654 | 4/1974 | Fed. Rep. of Germany . |
| 3200300 | 9/1982 | Fed. Rep. of Germany . |
| 2158577 | 6/1973 | France . |
| 2509710 | 1/1983 | France . |
| 0521924 | 5/1940 | United Kingdom . |

OTHER PUBLICATIONS

Patent Abstract of Japan, vol. 7, No. 189 (n-237) 1334, Aug. 18, 1983 and JP,A5889443.

*Primary Examiner*—Frederick R. Schmidt
*Assistant Examiner*—Steven P. Schad
*Attorney, Agent, or Firm*—Sandler & Greenblum

[57] ABSTRACT

A truck with a sidemember (1) resting, by its ends, on two adjustable crossmembers (3) fitted with a plurality of rotatable wheels (4) and including two slides (8), each bearing a support (15,16). The height, the longitudinal position, and the angular orientation of support 15, 16 can be adjusted by various adjustment devices. Each slide (8) has a locking device (9) on the sidemember (1), including a screw adapted to engage a nut in a plate (10) located in the sidemember. Each support (15-16) has a screw-jack (13,14) rests on a pipe (11) interdependent with each slide (8).

11 Claims, 6 Drawing Figures

SUPPORT TRUCK FOR VEHICLE OR EQUIPMENT

BACKGROUND OF THE INVENTION

1. Field of the Invention

The present invention relates to a truck designed to support equipment or a vehicle, or a set of materials and designed to travel easily in any direction.

2. Description of Pertinent Information

Devices currently available for lifting, tilting, and displacing materials and other equipment to be worked on have serious disadvantages. One such device is U.S. Pat. No. 1,341,621, which relates to a truck comprising a subframe that can be adjusted by its two side members. The side members are attached by a non-adjustable cross member. The ability to adjust the support surfaces and the side members is restricted by the clearances of apertures into to which stop pins are inserted.

French Pat. No. 2,158,577 relates to a moveable bench or ramp comprising side members having blocks which can be adjusted by placing pins in various openings in the device.

German Pat. No. 3,200 relates to a device having two telescopic side members attached to two rigid cross members. Again, the adjustment in the length and the width of the support surfaces attached to the telescopic members of the cross members is accomplished by fitting various pins in a plurality of apertures in the device.

All of these devices do not permit a stable or precise adjustment of the guiding, positioning, and supporting of the equipment to be supported by these devices. Thus, there is a need for a device providing precise and reliable adjustment of its height, its length, and its position so as to precisely adjust the length, height, and position of the materials supported by the device.

SUMMARY OF THE INVENTION

It is an object of the present invention to provide a device that supports various materials and equipment and which permits the precise and reliable adjustment of the guiding, positioning, and supporting of materials supported by the device.

The invention which achieves this objective relates to a truck having supports held by two slides, each including a guiding and locking device on one sidemember, having two ends resting on two rotating crossmembers fitted with revolving rollers.

According to a preferred embodiment of the invention, the sidemember has a hollow shape and has a slot therein in which a guiding device slide having a U-shaped slides, stradling on the aforesaid sidemember, each slide having a vertical pipe on which leans a threaded tubular removable brace, supporting a screw-jack, comprising each support. Each slide is locked on the sidemember it straddles by a screw, whose nut is located in the side member.

BRIEF DESCRIPTION OF THE DRAWINGS

An embodiment of the present support-truck is illustrated in the attached drawings in which.

DETAILED DESCRIPTION OF PREFERRED EMBODIMENT

Figure 1:
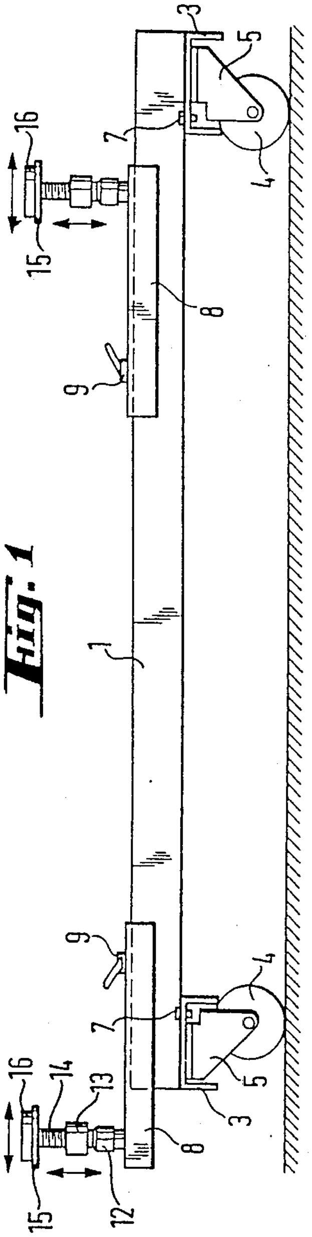
FIG. 1 is a front view of the truck, according to the invention.
Figure 2:
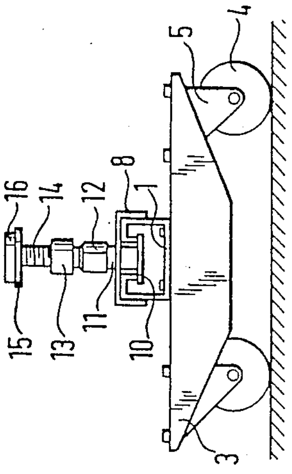
FIG. 2 is a side view of the present invention.
Figure 3:
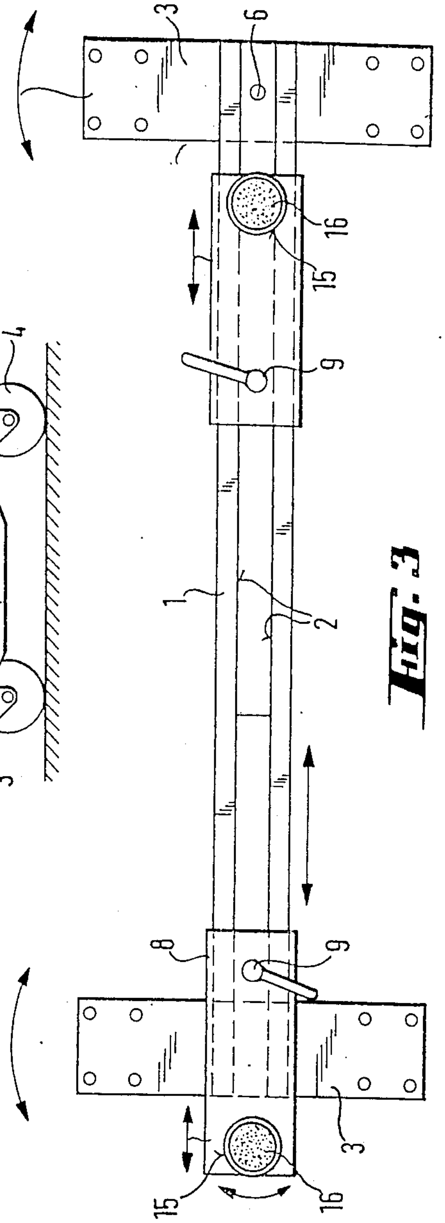
FIG. 3 is a top view of the present invention.

In FIGS. 1 to 4, the reference numeral (1) refers to the sidemembers of the truck, having a hollow metallic shape, whose top side has a slot (2), delimited by the turned down edges **(1*a*)** of the aforesaid side members.

This sidemember (1) is supported at its two ends, by two up-side-down U-shaped crossmembers 3, whose lateral sides are cut slantwise to allow for the revolving of wheels (4) assembled in revolving flange (5) in the usual way, fastened at each end of crossmembers (3).

Cross members 3 are adjustable with respect to the sidemember (1). To achieve this goal, a screw (6) crossing both sidemember 1 and crossmembers (3), functions as an axle, that may be tightened with an easy to handle nut, in order to lock crossmember (3) in the any desired position. Also provided is a stop (7), interdependant of the crossmember (3), which renders it impossible to move the crossmember (3) beyond an unsteady position.

Also provided are two U-shaped slides (8) provided on side member 1, straddling sidemember 3 so that slides 8 can slide on side member 1. Each slide (8) may be locked in a desired position on the sidemember (1) by a lever-screw (9). The head of this screw rests on the slide (8) and engages a nut in a plate (10) resting against the inner rims **(1*a*) of the sidemember (1). Rotating the screw (9) tightens the slide (8) and the sidemember (1). The slide may be locked in a position where it extends beyond the sidemember (1)**, which allows the apparatus to increase its capacity.

Figure 4:
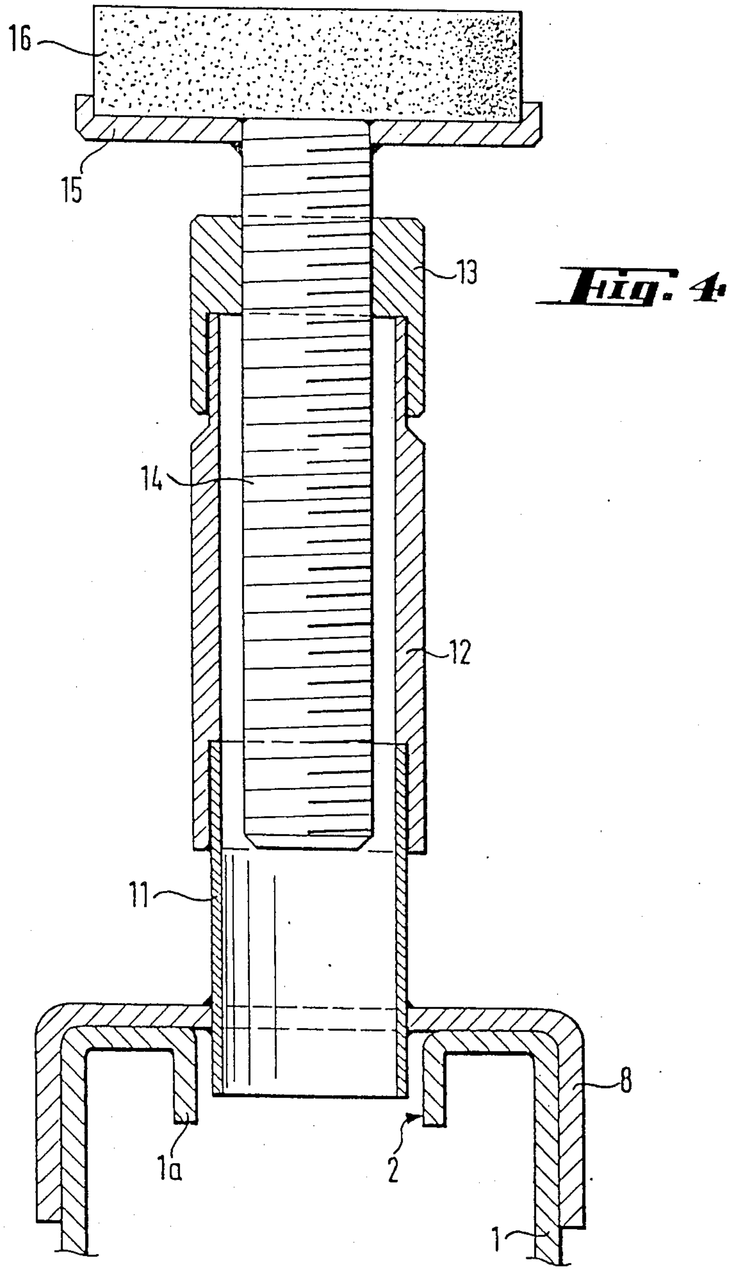
FIG. 4 is a cross-sectional view of an adjustable fulcrum of the truck of the present invention.

Each slide (8) has a support composed as shown on FIG. 4, of a pipe (11) extending through, and therefore interdependent with slide (8), so that its bottom end enters the slot (2) formed by the sidemember (1). On this part of the pipe (11), the inner shouldering of a tubular brace (12) rests. On the free and hammered end of the brace (12), the inner shouldering of a nut (13) rests.

It is within the scope of the present invention to have the nut (13) directly borne by the pipe (11), while removing the brace (12). It is also within the scope of the present invention to provide a set of braces of different heights, among which one selects the appropriate brace.

Also provided is a threaded rod 14 screwed in nut 13. Threaded rod 14 is capped by a cup shaped element or support 15, which supports a rubber plug (16), or an other gripping device, adapted to be supported by the supported element.

Figure 5:
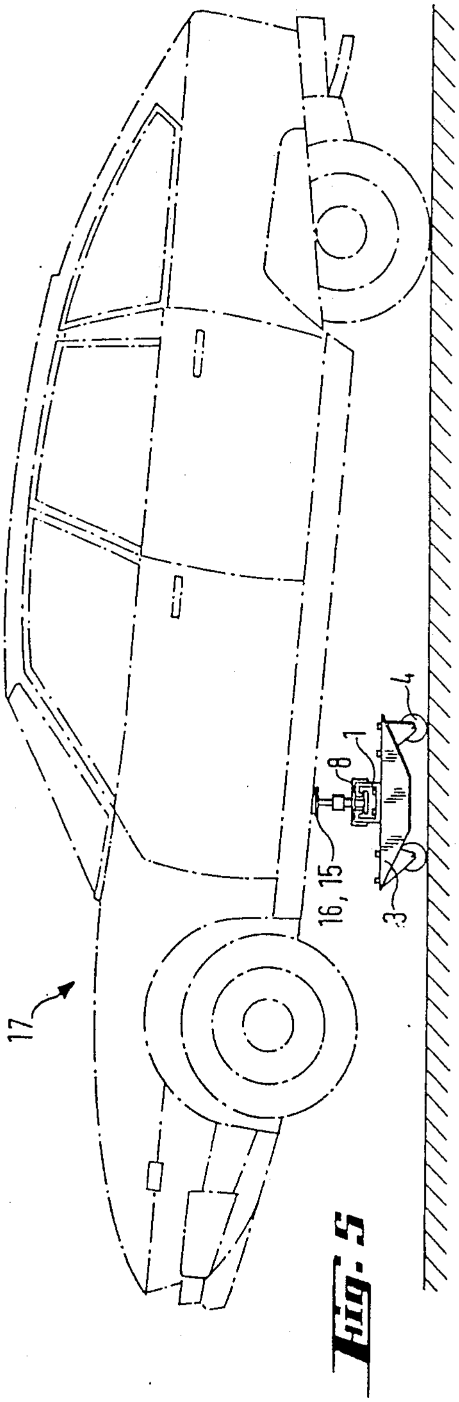
FIGS. 5 and 6 show a side view of the present invention in which the present invention is used to move a vehicle.
Figure 6:
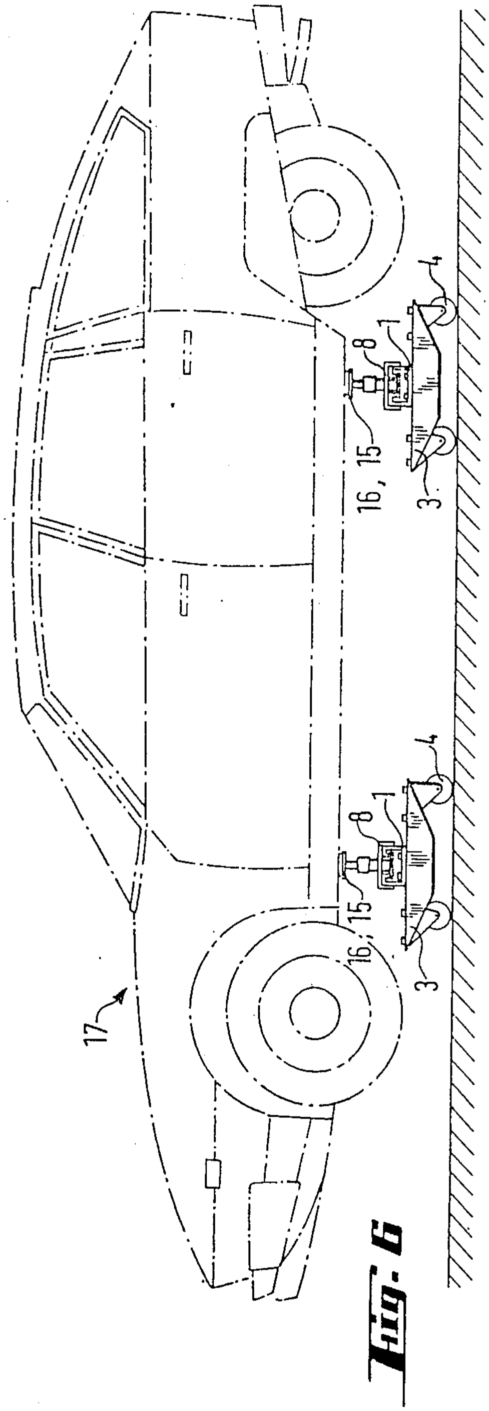

As shown in FIGS. 5 and 6, a particularly useful application of the support-truck of the present invention is illustrated. The truck support of the present invention in these figures is shown being used, in a garage, where vehicles must be transported from one place to the other, or must be parked, while waiting for spare parts. In addition, the present invention is also adapted to be used on vehicles without wheels, which are set on fix supports. These types of vehicles are difficult to be transported. However, the present invention renders these vehicles easy to be transported by setting the vehicle (17) on one truck (FIG. 5) or two trucks (FIG. 6).

In order to transport such a vehicle, after the vehicle has been lifted up, it is enough to slide a truck (FIG. 5) or two trucks (FIG. 6) under the vehicle (17), rotate crossmembers (3) to obtain an adequate steadiness of the whole combination of the truck and the vehicle, and adjust spacing and height of the plugs (16), so as to set them under the lifting points of the vehicle.

The spacing adjustment is made by moving the slides (8) on the sidemember (1) and by locking slides 8 in a desired position with screws (9).

The adjustment in height of the support (15) is made by rotating the rod (14) or the nut (13), which raises the plug (16) until it touches the subframe of the vehicle.

Next, it is enough to set the vehicle on the supports (15) with a minimum of effort and a softened contact of the vehicle with the rubber-plug (16).

When the vehicle is supported by two trucks (FIG. 6), rotating the nuts (13) allows for adjustment of the height of the four surface supports to the same level.

According to an alternative embodiment of the invention, the truck has two parallel sidemembers, resting on on two crossmembers, each sidemember having two sides.

It is within the scope of the present invention for the plugs (16) and even the supports (15) may be replaced by supports adapted to accommodate the shape of metallic objects placed on the support, or other objects. In addition, the supports can be metallic themselves.

I claim:

1. An apparatus for supporting vehicles and equipment, wherein said apparatus comprises:
- a sidemember comprising two ends and a longitudinally extending slot;
- a plurality of crossmembers, wherein said ends of said sidemember are supported by said crossmembers, wherein said crossmembers are pivotally attached to said sidemember;
- a plurality of rollers, attached to said crossmembers;
- a plurality of supports for supporing said vehicles and equipment, wherein each support comprises:
- an element comprising a bottom end engaging said slot in said sidemember;
- means for supporting said equipment and vehicles, wherein said supporting means is attached to said element;
- and means for adjusting the height of said supporting means;
- a plurality of slide members for sliding in the longitudinal direction on said sidemember, wherein each of said supports are supported by one of said slide members, wherein each slide member has an opening therein for permitting said element to extend therethrough to said slot in said sidemember; and
- locking means for locking each slide member at any position along the longitudinal extent of said side member.

2. The apparatus defined by claim 1 wherein said apparatus is a support truck and comprises two supports, two slide members, and two crossmembers.

3. The apparatus defined by claim 2 wherein said element comprises a pipe, wherein said adjusting means comprises:
- a nut attached to said pipe; and
- a threaded rod extending through said nut, wherein said supporting means is attached to the top of said threaded rod.

4. The apparatus defined by claim 3 wherein said pipe extends vertically from said sidemember, wherein said support further comprises a removable tubular brace attached to and supported by said pipe, wherein said nut is attached to said tubular brace, wherein said nut and rod together comprise a screw-jack apparatus.

5. The apparatus defined by claim 4 wherein said nut is supported by said tubular brace.

6. The apparatus defined by claim 4 wherein said supporting means comprises a cup shaped element and a rubber plug supported by said cup shaped element, wherein said threaded rod supports said cup shaped element.

7. The apparatus defined by claim 2 wherein said sidemember is hollow, wherein each of said side members is U-shaped and straddles said sidemember.

8. The apparatus defined by claim 2 wherein said apparatus further comprises a plate, wherein said locking means comprises:
- a plurality of screws, each extending through one of said side members into said slot; and
- a plurality of nuts attached to said plate and each engaging one of said screws.

9. The apparatus defined by claim 2 further comprising:
- a plurality of axles, wherein each axle pivotally attaches one of said crossmembers to said sidemember; and
- a plurality of nuts, wherein each nut is attached to one of said axles, wherein each nut locks one of said crossmembers in any desired angular position with respect to said sidemember.

10. The apparatus defined by claim 2 further comprising a stop for limiting rotation of said crossmember.

11. The apparatus defined by claim 1 wherein said locking means comprises a projection extending downwardly from each of said slide members into said slot.

* * * * *